United States Patent [19]

Graves

[11] Patent Number: 4,465,829

[45] Date of Patent: Aug. 14, 1984

[54] ELASTOMERIC COMPOSITION COMPRISING NATURAL RUBBER FOR USE UNDER DYNAMIC, HIGH HEAT CONDITIONS

[75] Inventor: Daniel F. Graves, Clinton, Ohio

[73] Assignee: The Firestone Tire & Rubber Company, Akron, Ohio

[21] Appl. No.: 529,461

[22] Filed: Sep. 6, 1983

[51] Int. Cl.³ .......................... C08K 3/04; C08K 3/34; C08K 5/01; C08L 7/00

[52] U.S. Cl. ..................................... 524/432; 524/83; 524/474; 524/525; 524/536

[58] Field of Search ................. 524/474, 525, 536, 83, 524/432

[56] References Cited

U.S. PATENT DOCUMENTS

| | | | |
|---|---|---|---|
| 2,138,895 | 12/1938 | Wiezevich | 525/232 |
| 2,184,966 | 12/1939 | Wiezevich | 525/232 |
| 2,202,363 | 5/1940 | Wiezevich | 524/481 |
| 2,218,167 | 10/1940 | Harkins | 525/232 |
| 3,477,968 | 11/1969 | Massoubre | 524/525 |
| 4,280,643 | 7/1981 | Bond et al. | 524/525 |
| 4,324,866 | 4/1982 | Furuichi | 521/140 |
| 4,362,840 | 12/1982 | Tabar et al. | 524/525 |

FOREIGN PATENT DOCUMENTS 51-82335  7/1976  Japan ............................ 524/525

OTHER PUBLICATIONS

Killgoar, P. C. et al., "A Low Modulus, High Fatigue Life Elastomer Compound for Suspension Applications", *Rubber Chemistry and Technology*, vol. 54, 5-6/81, pp. 347-365, TS187OR75.

*Primary Examiner*—Allan M. Lieberman
*Attorney, Agent, or Firm*—Frank J. Troy, Sr.

[57] ABSTRACT

Addition of particular low molecular weight polyisobutylene to natural rubber compounds reduces hysteresis, increases blow-out time and lowers compression set.

17 Claims, No Drawings

ELASTOMERIC COMPOSITION COMPRISING NATURAL RUBBER FOR USE UNDER DYNAMIC, HIGH HEAT CONDITIONS

TECHNICAL FIELD

This invention relates to reducing the heat build-up under dynamic (i.e. motion) conditions in cured elastomeric compositions containing natural rubber, i.e. reducing hysteresis in these compositions.

It is especially useful in providing cured elastomeric compositions for use in making articles containing natural rubber that are subject to friction and abrasion, e.g. bushings, such as tank track bushings, and treads for tires for trucks and off-road vehicles.

BACKGROUND OF THE INVENTION

Conventionally, heat build-up in natural rubber has been controlled by reducing the reinforcing filler level or by utilizing a monosulfidic cross linking system or by use of additives which chemically couple the reinforcing filler to the rubber. These alternatives have the disadvantages of reducing strength, especially tear strength properties.

SUMMARY OF THE INVENTION

It has now been discovered that addition of selected amounts of particular low molecular weight polyisobutylene to natural rubber containing compositions reduces heat build-up normally incident to dynamic conditions. In other words, such addition reduces hysteresis, i.e. reduces the amount of energy dissipated as heat when the rubber is subjected to a stress strain cycle. Contrary to conventional alternatives for reducing hysteresis, the composition of the invention allows the inclusion of preferred amounts of reinforcing filler and the use of normal cross-linking conditions without deleterious effect on tear strength.

It has further been discovered that the addition of the selected amounts of particular low molecular weight polyisobutylene increases blow-out time (ASTM Testing Procedure D-623) indicating a longer service time for a bushing made from the composition.

It has further been discovered that the addition of the polyisobutylene reduces compression set in the cured compositions and reduces viscosity (thereby providing ready handling and easy processing and allowing omission of conventional processing aids) in the uncured composition.

It has further been discovered that these advantages are obtained without unduly affecting modulus, tensile and elongation properties.

The compositions herein are elastomeric compositions for use under dynamic, high heat (e.g. up to 300° F.) conditions and comprise (a) 100 parts by weight of elastomer selected from the group consisting of natural rubber and blends of natural rubber with up to about 50% by weight synthetic rubber, (b) from 5 to about 15 parts by weight of polyisobutylene having a number average molecular weight ranging from about 800 to about 2,000, (c) from about 30 to about 75 parts by weight of reinforcing filler.

The aforementioned ingredients are utilized in combination with a curing system to provide a cured composition within the scope of the invention with the aforementioned very desirable attributes.

Since the aforementioned ingredients (a), (b), and (c) are normally kept apart from at least part of the curing system until just prior to curing, a composition comprising (a), (b) and (c) has independent status from the cured composition as it can be sold as a separate item of commerce to be later combined with the curing system.

The number average molecular weights referred to herein are those determined by vapor pressure osmometry.

The term "phr" as used hereinafter means parts by weight per 100 parts by weight of said elastomer.

DETAILED DESCRIPTION

The greater advantage is obtained when the elastomer ingredient is entirely of natural rubber. The term "natural rubber" is used herein to mean elastomeric substances obtained from trees and plants.

However, the problems associated with utilizing natural rubber under dynamic, high heat conditions are present to some extent even though some of the natural rubber is replaced by synthetic rubber and thus blends of natural rubber and synthetic rubber have been included herein. The synthetic can be any of those normally blended with natural rubber, e.g. polybutadiene, polystyrene-butadiene, neoprene and EPDM elastomers.

Turning now to the polyisobutylene ingredient, it is viscoelastic material and preferably is utilized in an amount ranging from about 8 to about 12 phr and has a number average molecular weight ranging from about 1,000 to about 1,500. A very suitable polyisobutylene is available under the trademark Indopol H-300 from Amoco; the manufacturer indicates that Indopol H-300 has a viscosity ranging from about 627 to 675 centistokes at 100° F. (ASTM D-445) and a number average molecular weight (as determined by vapor pressure osmometry) of about 1290.

As indicated above, the polyisobutylene ingredient is used in amounts generally ranging from about 5 to about 15 phr and has broad limits for number average molecular weight ranging from about 800 to about 2,000. If polyisobutylenes with molecular weights less than about 800 are utilized, the hysteresis reducing ability is lowered or eliminated and there is a loss in tear strength while if polyisobutylenes with molecular weights higher than about 2,000 are utilized the viscosity lowering effect is reduced or eliminated. Furthermore, if less than about 5 phr of the polyisobutylene is utilized, there is a lesser effect on viscosity and hysteresis reduction and utilizing amounts greater than about 15 phr results in further modulus and tensile loss.

Turning now to the reinforcing filler, it preferably is selected from the group consisting of carbon black and silica and very preferably is carbon black utilized in an amount ranging from about 35 to about 60 phr.

Turning now to the curing system, it preferably is an accelerated sulfur curing system comprising from about 0.5 to about 3 phr, very preferably from about 1.5 to about 2.5 phr, sulfur, and from about 0.5 to about 2 phr, preferably from about 1 to about 1.5 phr, accelerator. A preferred accelerator is sold under the name Amax by Vanderbilt Chemicals and is N-oxydiethylene-2-benzothiazole-sulfenamide. Other accelerators include, for example tetramethylthiuram disulfide, mercaptobenzothiazole, and cadmium, zinc or tellurium diethylthiocarbamate.

The curing system may also include zinc stearate as a promoter to reduce the time of curing. The zinc stearate is readily added in the form of zinc oxide (e.g. from about 5 to about 15 phr) plus stearic acid (e.g. from about 1 to about 5 phr) ingredients. While the rest of the curing system is ordinarily kept apart from the elastomer until just prior to curing, the stearic acid and zinc oxide can be included in a masterbatch of elastomer, polyisobutylene, and reinforcing filler.

Cured product can have for example, a running temperature of 205°-215° F. (ASTM Testing Procedure D-623), a blow-out time ranging from about 95 to about 150 minutes (ASTM Testing Procedure D-623), a hot ring tear at 212° F. ranging from about 475 to about 525 lbs./in. (test described hereinafter) and a Mooney Viscosity (ML$_4$) at 212° F. ranging from about 64 to about 67. It is very suitable for use in making bushings, especially tank track bushings (the elastomeric coverings for the spindles linking adjacent tank tracks) and tire treads, e.g. truck and off-road tire treads.

Processing is readily carried out, for example, by pouring the elastomer, polyisobutylene, reinforcing filler and zinc stearate precursors into a mixer and mixing to form a masterbatch, sheeting, cooling, returning the cooled sheeted material to the mixer and adding curing system ingredients and mixing for example for 1 to 3 minutes at 200°-250° F., sheeting again, and then shaping to form a final product with the method of shaping (e.g. extrusion, calendering) depending on the product being produced.

The invention is illustrated in the following specific example.

EXAMPLE

Three compositions were formulated. The composition of Run 1 is not within the scope of the invention and included no polyisobutylene but did include three processing aids. The composition of Run 2 is within the scope of the invention and included 5 phr polyisobutylene (Indopol H-300) in place of the three processing aids. The composition of Run 3 is within the scope of the invention and included 10 phr polyisobutylene (Indopol H-300) in place of the three processing aids. The three processing aids are listed below as "Process Oil" (an asphaltic processing oil), "Plasticizer" (rosin MR-575 from Mobil Oil) and Reogen (oil soluble sulfonic acid in paraffin oil).

Processing for each run was carried out as follows: The natural rubber, carbon black, any polyisobutylene, stearic acid, zinc oxide and any processing aids were poured into a 3 pound Banbury mixer and mixed for 5–6 minutes at 350° F. The mix was then dropped onto a roll mill and sheeted. The sheeted material was allowed to cool to room temperature. The cooled material was returned to the Banbury mixer and the sulfur and accelerator (Amax) were added and mixing was carried out for 2 minutes at 220° F. The mixture was then sheeted and the sheeted material was tested as described below.

The formulations were made up utilizing the following parts by weight of each ingredient. In the listing below PIB stands for polyisobutylene.

|  | Run 1 (No PIB) | Run 2 (5 phr PIB) | Run 3 (10 phr PIB) |
| --- | --- | --- | --- |
| Natural Rubber | 100 | 100 | 100 |
| Carbon Black | 40 | 40 | 40 |
| Stearic Acid | 3 | 3 | 3 |
| Zinc Oxide | 10 | 10 | 10 |
| Process Oil | 1 | — | — |
| Plasticizer | 1 | — | — |
| Reogen | 1 | — | — |
| Indopol H-300 | — | 5 | 10 |
| Amax | 1.2 | 1.2 | 1.2 |
| Sulfur | 2.0 | 2.0 | 2.0 |

Testing was carried out on samples made up from each of the formulations, for the following: Running Temperature (ASTM Testing Procedure D-623); Blow-out Time (ASTM Testing Procedure D-623); Hot Ring Tear (described hereinafter); Mooney Viscosity (ML$_4$) at 212° F. (carried out prior to curing; Compression Set (ASTM Testing Procedure D-395); 300% Modulus, Tensile and Elongation (ASTM Testing Procedure D-412).

The Hot Ring Tear testing consisted of cutting ring shaped samples with outside diameter of 2¼ inches, width of ¼ inch and thickness of 0.100 inch, notching the rings with a razor blade and testing them by pulling on an Instron tester utilizing a jaw speed of 20 inches per minute. A constant temperature box was utilized to obtain the 212° F. temperature.

Test results were as follows:

|  | Run 1 (No PIB) | Run 2 (5 phr PIB) | Run 3 (10 phr PIB) |
| --- | --- | --- | --- |
| Firestone Flexometer (250 pounds) | | | |
| % Deflection | 11.3 | 12.7 | 14.7 |
| Running Temperature (°F.) | 223 | 211 | 207 |
| Firestone Flexometer (550 lbs.) | | | |
| % Deflection | 26 | 26.7 | 30.0 |
| Blow-out Time (Minutes) | 89 | 98 | 144 |
| Hot Ring Tear (at 212° F.)-lbs./in. | 450 | 485 | 500 |
| ML$_4$ at 212° F. | 70.0 | 66.9 | 64.3 |
| Compression Set- 22 Hours at 158° F. (% of non-recovery) | 22.4 | 20.8 | 20.8 |
| 300% Modulus (30 minutes at 300° F.) lbs. per square inch | 2141 | 2006 | 1876 |
| Tensile (lbs. per square inch) | 3608 | 3300 | 3043 |
| Elongation (%) | 426 | 418 | 412 |

The above results show that inclusion of the polyisobutylene reduces running temperature (indicating hysteresis reduction), increases blow-out time, reduces viscosity in the uncured stock (despite processing aids being omitted) and reduces compression set while 300% modulus and tensile are somewhat reduced.

Similar results are obtained when up to 50% of the natural rubber is substituted with synthetic or when silica is utilized in place of carbon black or when other accelerators are used in place of Amax.

The formulations of Runs 1 and 2 are useful to provide long life tank track bushings and truck and off-road vehicle tire treads.

While the foregoing describes certain preferred embodiments of the invention, modifications will be readily apparent to those skilled in the art. Thus, the scope of the invention is intended to be defined by the following claims.

What is claimed is:

1. Elastomeric composition for use for providing a cured composition for use under dynamic, high heat conditions and having increased blow-out time without undue reduction in modulus, tensile and elongation properties, said elastomeric composition comprising
    (a) 100 parts by weight of elastomer selected from the group consisting of natural rubber and blends of natural rubber with up to about 50% by weight synthetic rubber selected from the group consisting of polybutadiene, polystyrene-butadiene, neoprene and EPDM elastomers,
    (b) from 5 to about 15 parts by weight of polyisobutylene having a number average molecular weight ranging from about 800 to about 2,000,
    (c) from about 30 to about 75 parts by weight of reinforcing filler.

2. Elastomeric composition as recited in claim 1, wherein the elastomer is all natural rubber.

3. Elastomeric composition as recited in claim 2, wherein the polyisobutylene has a number average molecular weight ranging from about 1,000 to about 1,500.

4. Elastomeric composition as recited in claim 3, wherein the reinforcing filler is selected from the group consisting of carbon black and silica.

5. Elastomeric composition as recited in claim 4, wherein the reinforcing filler is carbon black.

6. Elastomeric composition as recited in claim 5, wherein the reinforcing filler is utilized in an amount ranging from about 35 to about 60 parts by weight.

7. A cured elastomeric product for use under dynamic, high heat conditions and having increased blow-out time without undue reduction in modulus, tensile and elongation properties, said product prepared by curing a composition comprising
    (a) 100 parts by weight of elastomer selected from the group consisting of natural rubber and blends of natural rubber with up to about 50% by weight synthetic rubber selected from the group consisting of polybutadiene, polystyrene-butadiene, neoprene and EPDM elastomers,
    (b) from 5 to about 15 parts by weight of polyisobutylene having a number average molecular weight ranging from about 800 to about 2,000,
    (c) from about 30 to about 75 parts by weight of reinforcing filler,
    (d) an accelerated sulfur curing system.

8. A cured elastomeric product as recited in claim 7, in which the elastomer in said composition is all natural rubber.

9. A cured elastomeric product as recited in claim 8, wherein the polyisobutylene in said composition has a number average molecular weight ranging from about 1,000 to about 1,500.

10. A cured elastomeric product as recited in claim 9, wherein the reinforcing filler in said composition is selected from the group consisting of carbon black and silica.

11. A cured elastomeric product as recited in claim 10, wherein the reinforcing filler in said composition is carbon black.

12. A cured elastomeric product as recited in claim 11, wherein the curing system in said composition is an accelerated sulfur system comprising from about 0.5 to about 3 phr sulfur and from about 0.5 to about 2 phr accelerator.

13. A cured elastomeric product as recited in claim 12, wherein the accelerator, in said composition is N-oxydiethylene-2-benzothiazole-sulfenamide.

14. A cured elastomeric product as recited in claim 13, wherein the curing system in said composition additionally comprises from about 1 to about 5 phr stearic acid and about 5 to about 15 phr zinc oxide.

15. A bushing comprising the product of claim 12.

16. A tank track bushing comprising the products of claim 12.

17. A tread for a tire of a truck or an off-road vehicle, comprising the product of claim 12.

* * * * *